(12) United States Patent
Collins et al.

(10) Patent No.: US 9,823,728 B2
(45) Date of Patent: Nov. 21, 2017

(54) METHOD AND SYSTEM FOR REDUCED RATE TOUCH SCANNING ON AN ELECTRONIC DEVICE

(71) Applicant: NVIDIA Corporation, Santa Clara, CA (US)

(72) Inventors: Robert Collins, Morgan Hill, CA (US); Jonathan B. McCaffrey, Skaneateles, NY (US); Ali Ekici, Los Gatos, CA (US); Arman Toorians, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/018,381

(22) Filed: Sep. 4, 2013

(65) Prior Publication Data

US 2015/0062023 A1    Mar. 5, 2015

(51) Int. Cl.
    *G06F 1/32*    (2006.01)
(52) U.S. Cl.
    CPC .................... *G06F 1/3262* (2013.01)
(58) Field of Classification Search
    None
    See application file for complete search history.

(56) References Cited

U.S. PATENT DOCUMENTS

| | | |
|---|---|---|
| 5,124,804 A | 6/1992 | Socarras |
| 5,646,675 A | 7/1997 | Copriviza et al. |
| 5,995,081 A | 11/1999 | Kato |
| 7,119,803 B2 | 10/2006 | Stanley et al. |
| 7,441,233 B1 | 10/2008 | Orndorff et al. |
| 8,400,605 B2 | 3/2013 | Lee |
| 8,525,799 B1 | 9/2013 | Grivna et al. |
| 8,542,208 B2 | 9/2013 | Krah et al. |
| 8,773,386 B2 | 7/2014 | Wilson et al. |
| 8,816,985 B1 | 8/2014 | Tate et al. |
| 8,963,881 B2 | 2/2015 | Huang et al. |
| 8,970,506 B2 | 3/2015 | Krah et al. |
| 9,342,181 B2 | 5/2016 | Wyatt et al. |
| 2002/0063671 A1 | 5/2002 | Knapp |
| 2002/0085118 A1 | 7/2002 | Harris et al. |
| 2002/0167542 A1 | 11/2002 | Florin |
| 2004/0133923 A1 | 7/2004 | Watson et al. |

(Continued)

*Primary Examiner* — Kenneth B Lee, Jr.

(57) ABSTRACT

Embodiments of the present invention are capable of lowering touch scan rates in a manner that conserves power resources without compromising performance or user experience thereby promoting battery life. Embodiments of the present invention perform touch scan operations using a touch sensitive panel at a first scan rate. In response to certain events automatically detected within the mobile device (e.g., when a full-screen video is being displayed), embodiments of the present invention may then perform touch scan operations at a second scan rate that is slower than the first scan rate that also consumes less power compared to the first scan rate. As such, for events or use cases in which limited user interaction with the touch sensitive panel is typical, embodiments of the present invention may lower touch scan rates in a manner that still enables users to interact with applications (e.g., interaction with playback controls during video playback) and promotes efficient power usage and extends battery life.

18 Claims, 6 Drawing Sheets

(56) References Cited

U.S. PATENT DOCUMENTS

| | | |
|---|---|---|
| 2005/0012723 A1 | 1/2005 | Pallakoff |
| 2005/0171879 A1 | 8/2005 | Lin |
| 2005/0254702 A1 | 11/2005 | Era |
| 2007/0268200 A1 | 11/2007 | Fuller et al. |
| 2008/0036743 A1 | 2/2008 | Westerman et al. |
| 2008/0082930 A1 | 4/2008 | Omernick et al. |
| 2008/0137159 A1 | 6/2008 | Lim |
| 2008/0162996 A1 | 7/2008 | Krah et al. |
| 2008/0162997 A1 | 7/2008 | Vu et al. |
| 2008/0165141 A1 | 7/2008 | Christie |
| 2008/0278467 A1 | 11/2008 | Hwang et al. |
| 2008/0284745 A1 | 11/2008 | Kao et al. |
| 2009/0167727 A1 | 7/2009 | Liu et al. |
| 2009/0224776 A1 | 9/2009 | Keith |
| 2009/0256814 A1 | 10/2009 | Chung et al. |
| 2009/0262637 A1 | 10/2009 | Badaye et al. |
| 2009/0295786 A1 | 12/2009 | Ito et al. |
| 2010/0020092 A1 | 1/2010 | Canu et al. |
| 2010/0079508 A1 | 4/2010 | Hodge et al. |
| 2010/0097343 A1 | 4/2010 | Fang |
| 2010/0128201 A1 | 5/2010 | Lee |
| 2010/0134437 A1 | 6/2010 | Yang et al. |
| 2010/0171753 A1 | 7/2010 | Kwon |
| 2010/0235732 A1 | 9/2010 | Bergman |
| 2010/0238130 A1 | 9/2010 | Lin et al. |
| 2010/0253639 A1 | 10/2010 | Huang et al. |
| 2010/0277463 A1 | 11/2010 | Yen et al. |
| 2010/0309985 A1 | 12/2010 | Liu et al. |
| 2011/0012940 A1 | 1/2011 | Lim |
| 2011/0043546 A1 | 2/2011 | Matsumoto |
| 2011/0122088 A1 | 5/2011 | Lin et al. |
| 2011/0127340 A1 | 6/2011 | Aiken |
| 2011/0161707 A1 | 6/2011 | Blackburn et al. |
| 2011/0181519 A1 | 7/2011 | Tsai et al. |
| 2011/0242120 A1 | 10/2011 | Akai et al. |
| 2011/0261026 A1 | 10/2011 | Kim et al. |
| 2011/0273376 A1 | 11/2011 | Dickinson et al. |
| 2012/0030623 A1 | 2/2012 | Hoellwarth |
| 2012/0050206 A1 | 3/2012 | Welland |
| 2012/0054379 A1 | 3/2012 | Leung et al. |
| 2012/0068964 A1 | 3/2012 | Wright et al. |
| 2012/0084798 A1 | 4/2012 | Reeves et al. |
| 2012/0105357 A1 | 5/2012 | Li et al. |
| 2012/0105362 A1 | 5/2012 | Kremin et al. |
| 2012/0146957 A1 | 6/2012 | Dunagan |
| 2012/0154324 A1 | 6/2012 | Wright et al. |
| 2012/0176327 A1 | 7/2012 | Na et al. |
| 2012/0176546 A1 | 7/2012 | Yoon |
| 2012/0223894 A1 | 9/2012 | Zhao et al. |
| 2012/0262463 A1 | 10/2012 | Bakalash et al. |
| 2012/0327041 A1 | 12/2012 | Harley et al. |
| 2013/0038587 A1 | 2/2013 | Song et al. |
| 2013/0044078 A1 | 2/2013 | Hallenberg et al. |
| 2013/0069894 A1 | 3/2013 | Chen et al. |
| 2013/0088479 A1 | 4/2013 | Kim et al. |
| 2013/0100071 A1 | 4/2013 | Wright et al. |
| 2013/0135191 A1 | 5/2013 | Shiokawa |
| 2013/0141423 A1 | 6/2013 | Cho et al. |
| 2013/0194242 A1 | 8/2013 | Park et al. |
| 2013/0222323 A1 | 8/2013 | McKenzie |
| 2013/0249823 A1 | 9/2013 | Ahn et al. |
| 2013/0265276 A1* | 10/2013 | Obeidat et al. ............... 345/174 |
| 2013/0285933 A1 | 10/2013 | Sim et al. |
| 2014/0028633 A1 | 1/2014 | Mercea et al. |
| 2014/0092031 A1 | 4/2014 | Schwartz et al. |
| 2014/0118257 A1 | 5/2014 | Baldwin |
| 2014/0149754 A1 | 5/2014 | Silva et al. |
| 2014/0204036 A1 | 7/2014 | Schillings et al. |
| 2014/0267192 A1 | 9/2014 | Matsuura et al. |
| 2014/0340387 A1 | 11/2014 | Song et al. |
| 2014/0362109 A1 | 12/2014 | Han et al. |
| 2015/0015497 A1 | 1/2015 | Leigh |
| 2015/0015528 A1 | 1/2015 | Vandermeijden |
| 2015/0029163 A1 | 1/2015 | Harris et al. |

* cited by examiner

METHOD AND SYSTEM FOR REDUCED RATE TOUCH SCANNING ON AN ELECTRONIC DEVICE

FIELD OF THE INVENTION

Embodiments of the present invention are generally related to the field of touch sensitive devices capable of capturing touch input.

BACKGROUND OF THE INVENTION

Conventional computer-implemented devices offer users a variety of different ways to interact with applications executed on these devices, such as through touchscreen panels. Touchscreen panels used by conventional mobile devices consume power partly based on how frequently the panel is "scanned" for touches. As such, faster touch scan rates are generally used by conventional mobile devices to improve the accuracy, smoothness, and latency of touch input received, which are all considered to be important performance metrics for electronic device including modern mobile devices.

However, setting touch scan rates at such high frequencies may also unnecessarily consume power on these mobile devices compared to scanning at lower frequencies for applications requiring minimal user interaction. Accordingly, the inefficiencies associated with conventional mobile devices may result in wasted power resources and may ultimately lead to reduced batter life.

SUMMARY OF THE INVENTION

What is needed is a solution that is capable of lowering touch scan rates for applications and/or system events that require minimal user interaction. Embodiments of the present invention are capable of lowering touch scan rates in a manner that conserves power resources without compromising performance or user experience thereby promoting battery life. Embodiments of the present invention perform touch scan operations using a touch sensitive panel at a first scan rate. In response to certain events automatically detected within the mobile device (e.g., when a full-screen video is being displayed), embodiments of the present invention may then perform touch scan operations at a second scan rate that is slower than the first scan rate that also consumes less power compared to the first scan rate. As such, for events or use cases in which limited user interaction with the touch sensitive panel is typical, embodiments of the present invention may lower touch scan rates in a manner that still enables users to interact with applications (e.g., interaction with playback controls during video playback) and promotes efficient power usage and extends battery life.

More specifically, in one embodiment, the present invention is implemented as a method of activating a touch sensitive panel of a computing device. The method includes scanning the touch sensitive panel at a first rate to detect a first-type user interaction therewith. Also, the method includes detecting an event within the computing device. In one embodiment, the event is an identification of a surface type made when compositing layers of surface data associated with a plurality of applications into a final image for display, where the compositing includes, using a compositing module, receiving the layers of surface data from the plurality of applications and extracting surface type information from the surface data. In one embodiment, the surface type is a video surface. In one embodiment, the surface type is a camera surface. In one embodiment, the event is a telephonic event. In one embodiment, the event is a soft keyboard display event. In one embodiment, the event is a full-screen video display event.

Furthermore, the method includes, responsive to the event, scanning the touch sensitive panel at a second rate to detect a second-type user interaction therewith, the second rate being slower than the first rate in which less power is consumed at the second rate versus the first rate and wherein further the event indicates a presence of a use case of the computing device in which limited user interaction of the touch sensitive panel is typical.

In one embodiment, the present invention is implemented as a system for activating a touch sensitive panel of a computing device. The system includes a touch sensor operable to perform scanning operations at a first rate to detect a first-type user interaction therewith, in which the touch sensor is operable to perform the scanning operations at a second rate to detect a second-type user interaction therewith, the second rate being slower than the first rate where less power is consumed at the second rate versus the first rate.

The system also includes a monitoring module operable to prescribe the second rate for the touch sensor via control signals sent thereto responsive to a detection of an event within the computing device, in which the event indicates a presence of a use case of the computing device in which limited user interaction of the touch sensor is typical. In one embodiment, the event is an identification of a surface type made by a compositing module, in which the compositing module is operable to composite layers of surface data associated with a plurality of applications into a final image for display, in which the compositing module is further operable to receive the layers of surface data from the plurality of applications and abstract a surface type information from the layers of surface data. In one embodiment, the surface type is a video surface. In one embodiment, the surface type is a camera surface. In one embodiment, the event is a telephonic event. In one embodiment, the event is a soft keyboard display event. In one embodiment, the event is a full-screen video display event.

In one embodiment, the present invention is implemented as a method of activating a touch sensitive panel of a computing device. The method includes scanning the touch sensitive panel at a first rate to detect a first-type user interaction therewith, in which the first rate is a default scan rate. Also, the method includes detecting an event within the computing device. In one embodiment, the event is an identification of a surface type made when compositing layers of surface data associated with a plurality of applications into a final image for display, where the compositing includes, using a compositing module, receiving the layers of surface data from the plurality of applications and extracting surface type information from the surface data. In one embodiment, the surface type is a video surface. In one embodiment, the surface type is a camera surface. In one embodiment, the event is a telephonic event. In one embodiment, the event is a soft keyboard display event. In one embodiment, the event is a full-screen video display event.

Additionally, the method includes, responsive to the event, scanning the touch sensitive panel at a second rate to detect a second-type user interaction therewith, the second rate being slower than the first rate in which less power is consumed at the second rate versus the first rate and where further the event indicates a presence of a use case of the computing device in which limited user interaction of the touch sensitive panel is typical. Furthermore, the method includes, responsive to detecting a termination of the event, scanning the touch sensitive panel at the default rate.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIGS. 3 and 4) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, an object, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Figure 1:
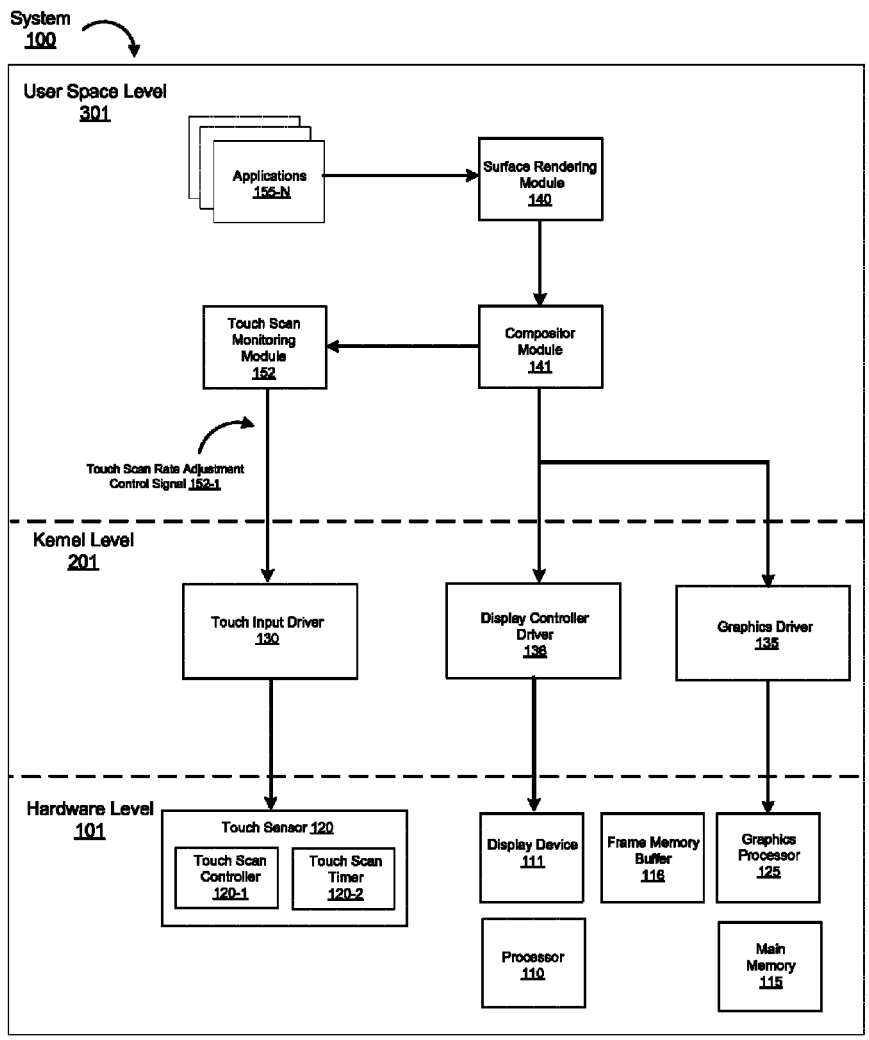
FIG. 1 is a block-level diagram depicting an exemplary touch scan adjustment system in accordance with embodiments of the present invention.

FIG. 1 is a block-level diagram of an exemplary capacitive touch device (e.g., system 100) capable of adjusting its touch scan rate in accordance with embodiments of the present invention. According to one embodiment of the present invention, system 100 may include hardware level circuits 101, kernel level 201 and user space 301. Hardware level 101 may comprise touch sensor 120, display device 111, frame memory buffer 116, graphics processor 125, processor 110, as well as main memory 115. Kernel level 201 may comprise touch input driver 130, display controller driver 136 and graphics driver 135. Furthermore, user space 301 may comprise applications 155-N, surface rendering module 140 as well as compositor module 141.

Exemplary Hardware Level in Accordance with Embodiments of the Present Invention According to one embodiment of the present invention, touch sensor 120 may include the functionality to detect the occurrence of touch events performed coincidental to the performance of touch scan operations. Touch sensor 120 may be a capacitive touch-sensing device that includes a plurality of plates that may be charged during a powered state (e.g., using power resources coupled to system 100). The plurality of interconnection points may be spatially arranged in a manner such that each point represents a distinct location (e.g., sampling point) within touch sensor 120. During a powered state, each interconnection point may be uniformly charged using the same voltage or individually charged with different voltages. Furthermore, in one embodiment, prescribed threshold values (e.g., voltages) assigned to each plate may be stored within registers (not shown) coupled to touch sensor 120.

During the performance of touch scan operations, according to one embodiment, touch scan controller 120-1 may include the functionality to calculate capacitance discharge levels associated with sampling points at a given time using well-known discharge calculation procedures. Furthermore, touch scan controller 120-1 may include the functionality to detect the performance of touch events based on calculated discharge levels. For instance, when a touch event is performed by an object (e.g., a user's finger) on touch sensor 120 during a powered state, the object may make contact with a particular set of sampling points (e.g., set of charged plates) located within touch sensor 120. This contact may result in the object providing additional capacitance to the current capacitance levels of those sampling points contacted.

As such, touch scan controller 120-1 may perceive the corresponding increases in capacitance levels at these sampling points by referencing prescribed threshold values assigned to each plate. In this manner, touch scan controller 120-1 may register detected changes in capacitance levels as touch events performed at those particular sampling points affected. Furthermore, according to one embodiment, touch scan controller 120-1 may include the functionality to communicate the location of these affected sampling points to touch input driver 130 for further processing by components within system 100 (e.g., components within user space 301). For instance, data gathered by touch scan controller 120-1 concerning touch events detected may be made available to applications (e.g., applications 155-N) for further processing.

In one embodiment, touch sensor 120 may include the functionality to convert analog signals discharged from a set of points associated with a particular sampling point into digital signals using digital signal converters (e.g., DACs) for further processing by components of system 100. For instance, in one embodiment, touch sensor 120 may use digital signals to create a digital bitmap (e.g., 2 dimensional plot of magnitudes) to determine the location of touch events performed.

According to one embodiment, touch scan timer 120-2 may include the functionality to set the time between the performance of touch scan operations for a set of sampling points within touch sensor 120 (e.g., 120-240 Hz). A scan typically traverses the entire touch panel surface area. In this manner, touch scan timer 120-2 may be configured to trigger the performance of touch scan operations by touch scan controller 120-1 at a given scan rate. In one embodiment, touch scan timer 120-2 may be configured to trigger the performance of touch scan operations for different sets of sampling points within touch sensor 120 at different times.

In one embodiment, display device 111 may include the functionality to render output. Examples of display device 111 may include, but are not limited to, a liquid crystal display (LCD), a plasma display, cathode ray tube (CRT) monitor, etc. Additionally, in one embodiment, main processor 110 may include the functionality to process instructions from applications (e.g., applications 155-N) to read data received from touch sensor 120 and/or optional input devices (not shown) and to store the data in frame memory buffer 116 for further processing via internal communications bus. Optional input devices may include, but are not limited to, keyboards, mice, joysticks, microphones, etc. Additionally, in one embodiment, graphics processor 125 may include the functionality to generate pixel data for output images in response to rendering instructions by an application and may be configured as multiple virtual graphic processors that are used in parallel (concurrently) by a number of applications executing in parallel.

Frame memory buffer 116, in one embodiment, may include the functionality to store pixel data for each pixel of an output image. In one embodiment, frame memory buffer 116 and/or other memory may be part of main memory 115 which may be shared with processor 110 and/or graphics processor 125. Additionally, in one embodiment, system 100 may include additional physical graphics processors, each configured similarly to graphics processor 125. In one embodiment, these additional graphics processors may be configured to operate in parallel with graphics processor 125 to simultaneously generate pixel data for different portions of an output image, or to simultaneously generate pixel data for different output images Exemplary Kernel Level in Accordance with Embodiments of the Present Invention According to one embodiment of the present invention, kernel level 201 may be a partition within the virtual memory space of a conventional operating system. In one embodiment, kernel level 201 may be reserved for running kernel level processes, extensions, as well as device drivers. As such, kernel level 201 may isolate and allocate access to devices located within hardware level 101.

In one embodiment, touch input driver 130 may be configured to communicate with touch sensor 120/and or display device 111 (via display controller driver 136) to obtain touch input information provided from one or more users. Touch input information may include sampling points associated with the execution of user mode gestures performed by one or more users. Gestures may include, but are not limited to "smooth gestures", "swipes", "flings", "pinch and zoom", etc. According to one embodiment, the output provided by touch input driver 130 may be communicated to one or more applications (e.g., applications 155-N) capable of receiving touch input commands residing within user space 301. Display controller driver 136 may be configured to communicate processed surface data received from compositor module 141 to display device 111 and/or frame memory buffer 116 for rendering. Additionally, graphics driver 135 may be used to configure graphics processor 125 and assist in generating a stream of rendered data to be delivered to display device 111.

Exemplary User Space Level in Accordance with Embodiments of the Present Invention According to one embodiment of the present invention, user space level 301 may be a location within the virtual memory of a conventional operating system in which applications are executed in a user-mode level of operation. User space level 301 may include applications and libraries used in communications between the operating system and other components of system 100 (e.g., kernel level 201). In one embodiment, applications operating within user space level 301 (e.g., applications 155-N) may submit a layer including surface rendering instructions to surface rendering module 140 for further processing.

Surface rendering module 140 may include the functionality to manage multiple layers of surface rendering instructions provided by different applications within user space level 301. As such, applications within user space level 301 (e.g., applications 155-N) may streamline data (e.g., surface objects) associated with their respective surfaces to surface rendering module 140 for further processing by compositor module 150. According to one embodiment, surface rendering module 140 may be capable of allocating off-screen buffers to process pixel content associated with the different surfaces to be rendered.

Compositor module 141 may include the functionality to merge several layers of surfaces together and render a single resultant image for display to the user (e.g., via display device 111). In this manner, display elements belonging to different applications may be merged into a single display area by compositor module 141. In one embodiment, compositor module 141 may include the functionality to independently render multiple layers using off-screen buffers allocated by surface rendering module 140.

Additionally, compositor module 141 may include the functionality to abstract embedded information (e.g., metadata) from the layers it processes. According to one embodiment, compositor module 141 may be capable of extracting surface type information from layers processed at run-time. For instance, compositor module 141 may be configured to identify video layers participating in the compositing process using abstracted information. Furthermore, compositor module 141 may also be capable of extracting display attributes from video layers identified. For instance, using embedded information abstracted from a video layer, compositor module 141 may be capable of determining a percentage of the total screen area to be occupied (e.g., full-screen view) by a video layer at run-time. Additional surface types may include, but are not limited to, soft keyboard displays, camera surfaces, telephonic surfaces, etc. (e.g., telephone applications providing surfaces).

Touch scan monitoring module 152 may include the functionality to dynamically adjust the rate at which touch scan operations are performed by touch sensor 120 in response to surface types identified by compositor module 141. According to one embodiment, touch scan monitoring module 152 may be configured to receive signals from compositor module 141 when a particular surface is being processed by compositor module 141. For instance, in one embodiment, touch scan monitoring module 152 may be configured to receive signals from compositor module 141 whenever a video layer is contemporaneously identified by compositor module 141 for compositing. Furthermore, in response to signals received from compositor module 141, touch scan monitoring module 152 may then proceed to send control signals (e.g., touch scan rate adjustment control signal 152-1) to touch input driver 130.

Control signals sent by touch scan monitoring module 152 may include prescribed scan rates (frequencies) which may correspondingly decrease the rate of touch scans performed by touch sensor 120. In one embodiment, control signals may include parameters that adjust active and/or idle system timers. As such, the reduced frequency of touch scans may also proportionally reduce the amount of power consumed by touch sensor 120 when performing touch scan operations.

Additionally, embodiments of the present invention may be capable of recognizing surfaces that utilize certain hardware features of a device. According to one embodiment, compositor module 141 may be capable of recognizing surfaces that utilize camera features of camera hardware (not pictured) coupled to system 100. Accordingly, touch scan monitoring module 152 may send control signals which correspondingly decrease the rate of touch scans performed by touch sensor 120 in response to a detection of surfaces utilizing the camera features of system 100. According to one embodiment, compositor module 141 may be capable of recognizing surfaces that utilize soft keyboard displays as well as the telephonic features of associated with system 100.

Figure 2A:
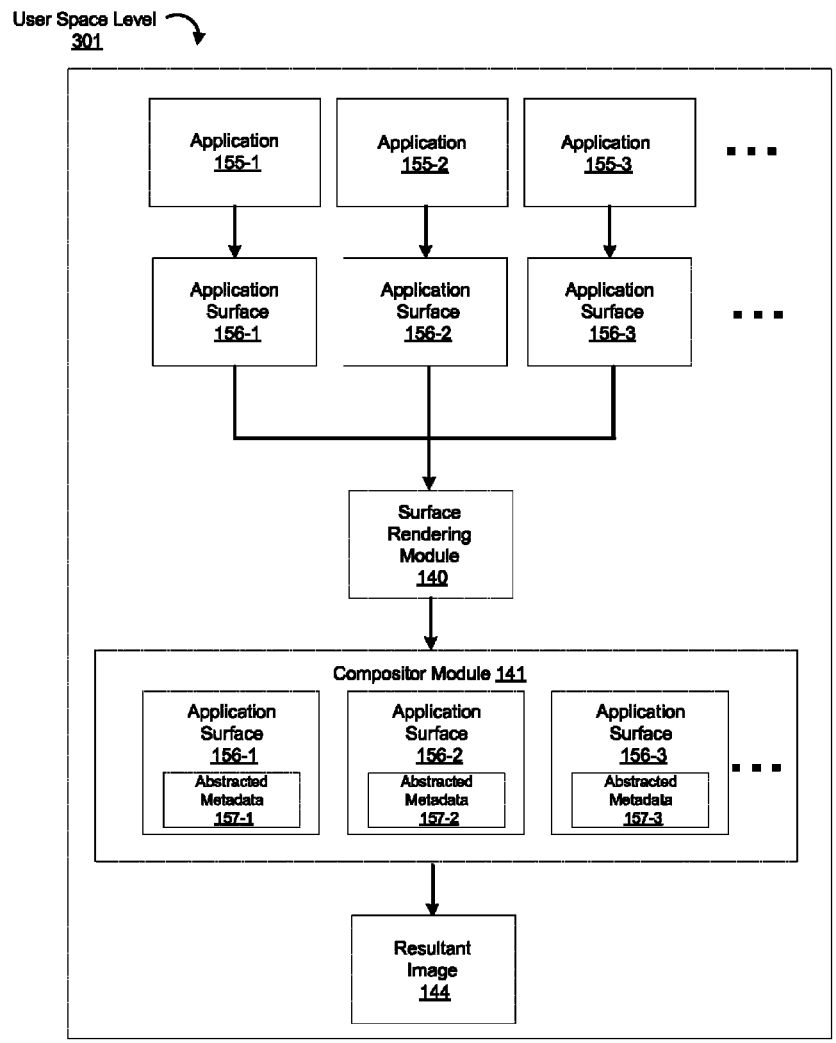
FIG. 2A is a flowchart that depicts an exemplary computer-implemented surface compositing process in accordance with embodiments of the present invention.

FIG. 2A is a block-level diagram of an exemplary surface type identification process used in the adjustment of touch scan rates in accordance with embodiments of the present invention. In the embodiment depicted in FIG. 2A, several applications may be executed within user space level 301. For instance, application 155-1 may be an application used by system 100 to display wallpaper background images; application 155-2 may be an application used by system 100 for displaying desktop icons; and application 155-3 may be an application used by system 100 for displaying system status icons (e.g., battery usage icon, received messages icon, etc.).

As illustrated in FIG. 2A, each executed application may provide surface rendering module 140 with a surface for compositor module 141 to render (e.g., application surfaces 156-1, 156-2 and 156-3) in response to inputs received from kernel level 201 (e.g., via system input service used by system 100). Surface rendering module 140 may proceed to present application surfaces 156-1, 156-2, and 156-3 to compositor module 141 for compositing. During the compositing process of these layers, compositor module 141 may merge several display elements associated with different applications (e.g., 155-1, 155-2,155-3) and render a single resultant image for display to the user (e.g., resultant image 144). Furthermore, during the compositing process, compositor module 141 may be capable of extracting surface information embedded in the metadata of each surface (e.g., abstracted metadata 157-1, 157-2,157-3).

Figure 2B:
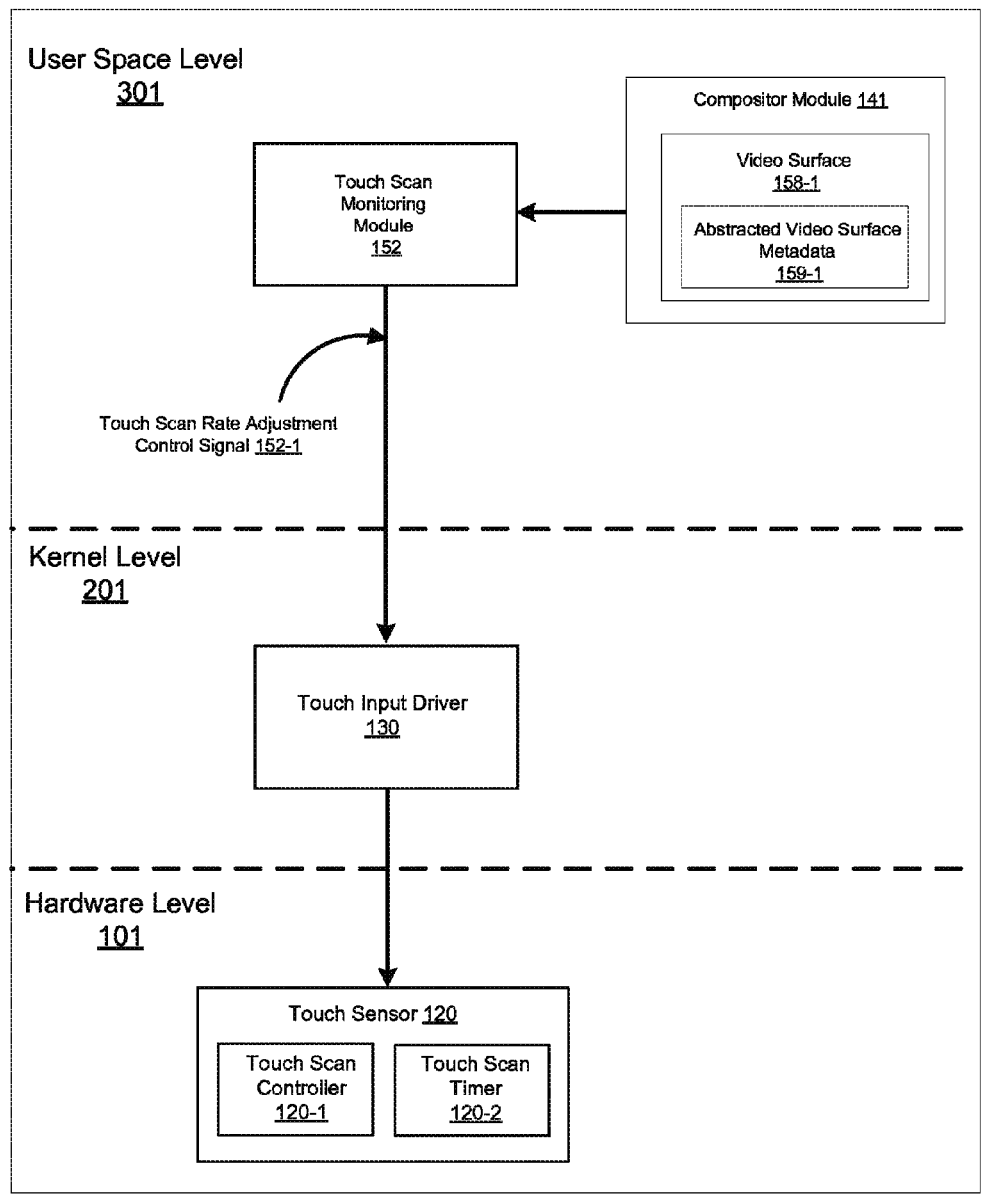
FIG. 2B is a block-level diagram depicting an exemplary touch scan adjustment process responsive to identified surfaces in accordance with embodiments of the present invention.

FIG. 2B is a block-level diagram of an exemplary touch scan rate adjustment process responsive to an identification of a particular surface type in accordance with embodiments of the present invention. As depicted in the embodiment depicted in FIG. 2B, compositor module 141 may be configured to identify video layers (e.g., video surface 158-1) provided by an application (e.g., media player) using information abstracted during the compositing process. Furthermore, compositor module 141 may be capable of identifying display attributes associated with video layers identified. For instance, abstracted video surface metadata 159-1 may contain instructions (e.g., coded flags) which may alert compositor module 141 that the video surface 158-1 is to be executed in a "full-screen" mode (e.g., occupies more than 50% of the display screen). As such, compositor module 141 may include the functionality to send signals to touch scan monitoring module 152 in response to recognizing instructions for video surface 158-1 to be executed in a "full-screen" mode.

Touch scan monitoring module 152 may include the functionality to send control signals (e.g., touch scan rate adjustment control signal 152-1) to touch input driver 130 in response to signals received from compositor module 141. According to one embodiment, control signals sent by touch scan monitoring module 152 may include prescribed touch scan rates which may be used by touch input driver 130 to modify the rate of touch scans being performed by touch sensor 120. For instance, touch scan rate adjustment control signal 152-1 sent by touch scan monitoring module 152 may instruct touch input driver 130 to reduce the rate of touch scans being performed by touch sensor 120 (e.g., 120-240 Hz) to a lower scan rate (e.g., 10 Hz). According to one embodiment, touch input driver 130 may correspondingly send instructions to touch scan timer 120-2 to modify the current rate of touch scans performed by touch sensor 120 to the prescribed rate.

Furthermore, touch scan monitoring module 152 may be capable of restoring the touch scan rate to a previous or default touch scan rate. For instance, in response to the full-screen video mode being exited, touch scan monitoring module 152 may send control signals to touch input driver 130 to increase the rate of touch scans being performed by touch sensor 120 from the prescribed rate (e.g., 10 Hz) to a default touch scan rate (e.g., 120-240 Hz). As such, touch sensor 120 may also consume power at a rate commensurate with the default touch scan rate.

In one embodiment, touch scan monitoring module 152 may be capable of restoring the touch scan rate to the default touch scan rate in response to detected touch events performed on touch sensor 120. In one embodiment, touch input driver 130 may utilize active and/or idle system timers in determining when to return to a default touch scan rate. For instance, after a pre-determined period of time has elapsed in which no touch events were detected, touch sensor 120 may return to using a default touch scan rate to perform touch scan operations.

Although the embodiment depicted in FIG. 2B is configured to reduce touch scan rates in response to video layers identified by compositor module 141, it should be appreciated that embodiments of the present invention are not limited to such configurations. For example, in one embodiment, compositor module 141 may be configured to recognize surface layers associated with camera functionality. For instance, in one embodiment, compositor module 141 may be configured to identify "live preview" windows from surfaces associated with camera playback.

Figure 2C:
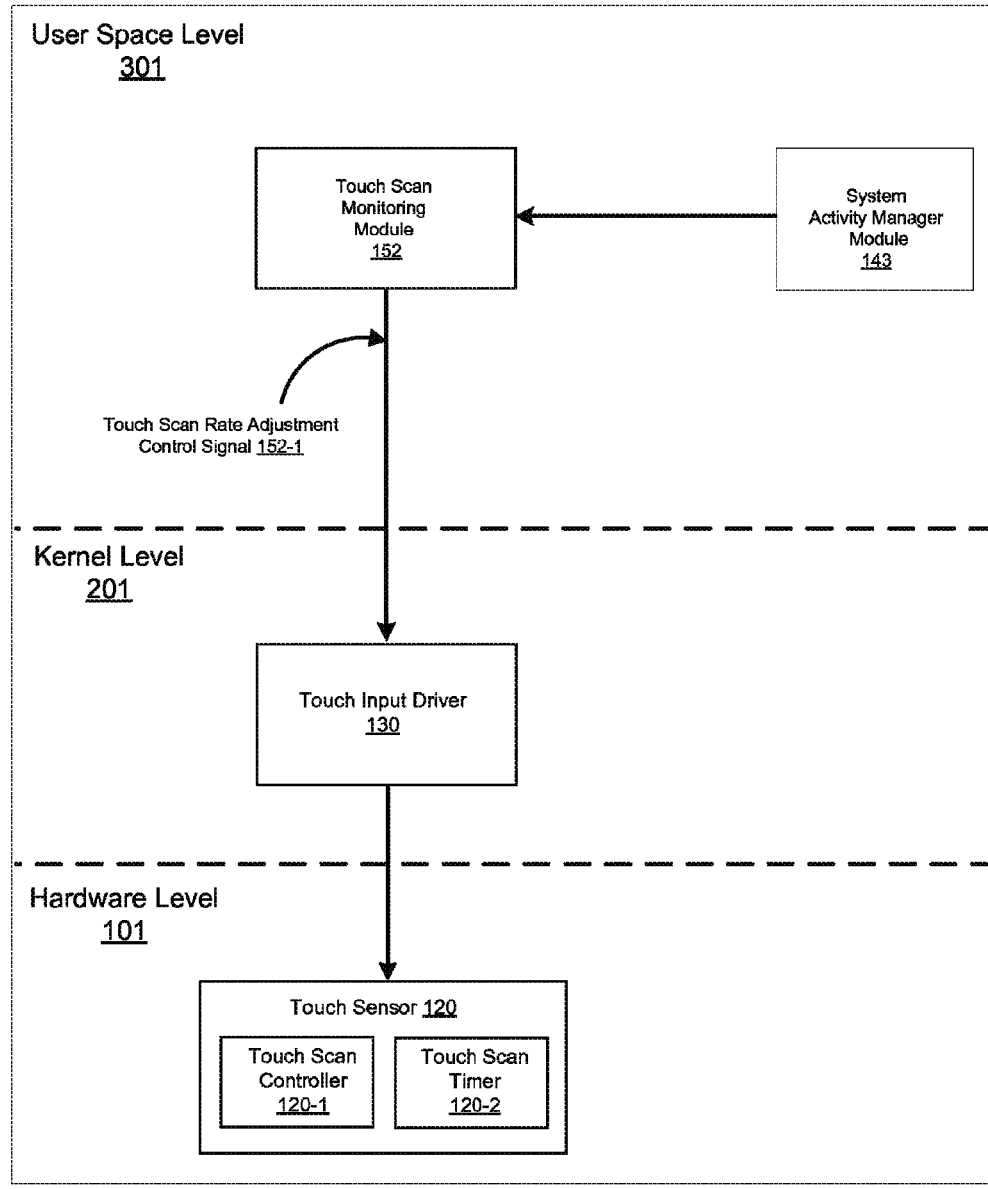
FIG. 2C is a block-level diagram depicting an exemplary touch scan adjustment process responsive to detected system events in accordance with embodiments of the present invention.

FIG. 2C is a block-level diagram of an exemplary touch scan rate adjustment process responsive to active system displays and/or processes in accordance with embodiments of the present invention. System activity manager 143 may be capable of tracking active displays (windows) and system processes on system 100. Additionally, system activity manager 143 may also be capable of communicating inputs received (e.g., via touch sensor 120) to applications configured to receive them. As such, system activity manager 143 may be capable of recognizing active displays capable of receiving input through soft keyboard displays. Soft keyboard displays may be used to enable users (e.g., users using conventional mobile devices) to provide text within text-enabled fields using an onscreen keyboard. Accordingly, in one embodiment, when a display capable of receiving input via soft keyboard display is active, system activity manager 143 may send signals to notify touch scan monitoring module 152. In response to the signals received, touch scan monitoring module 152 may send control signals which may correspondingly decrease the rate of touch scans performed by touch sensor 120.

Furthermore, according to one embodiment, system activity manager 143 may capable of recognizing telephonic events associated with system 100 (e.g., receiving/answering a phone call). In this manner, system activity module 143 may be used by components of system 100 to receive alerts when the telephonic features of system 100 are engaged (e.g., by a user). As such, touch scan monitoring module 152 may receive signals from system activity module 143 in response to a detected telephonic event. In response to receiving these signals, touch scan monitoring module 152 may then proceed to send control signals which may correspondingly decrease the rate of touch scans performed by touch sensor 120.

Figure 3:
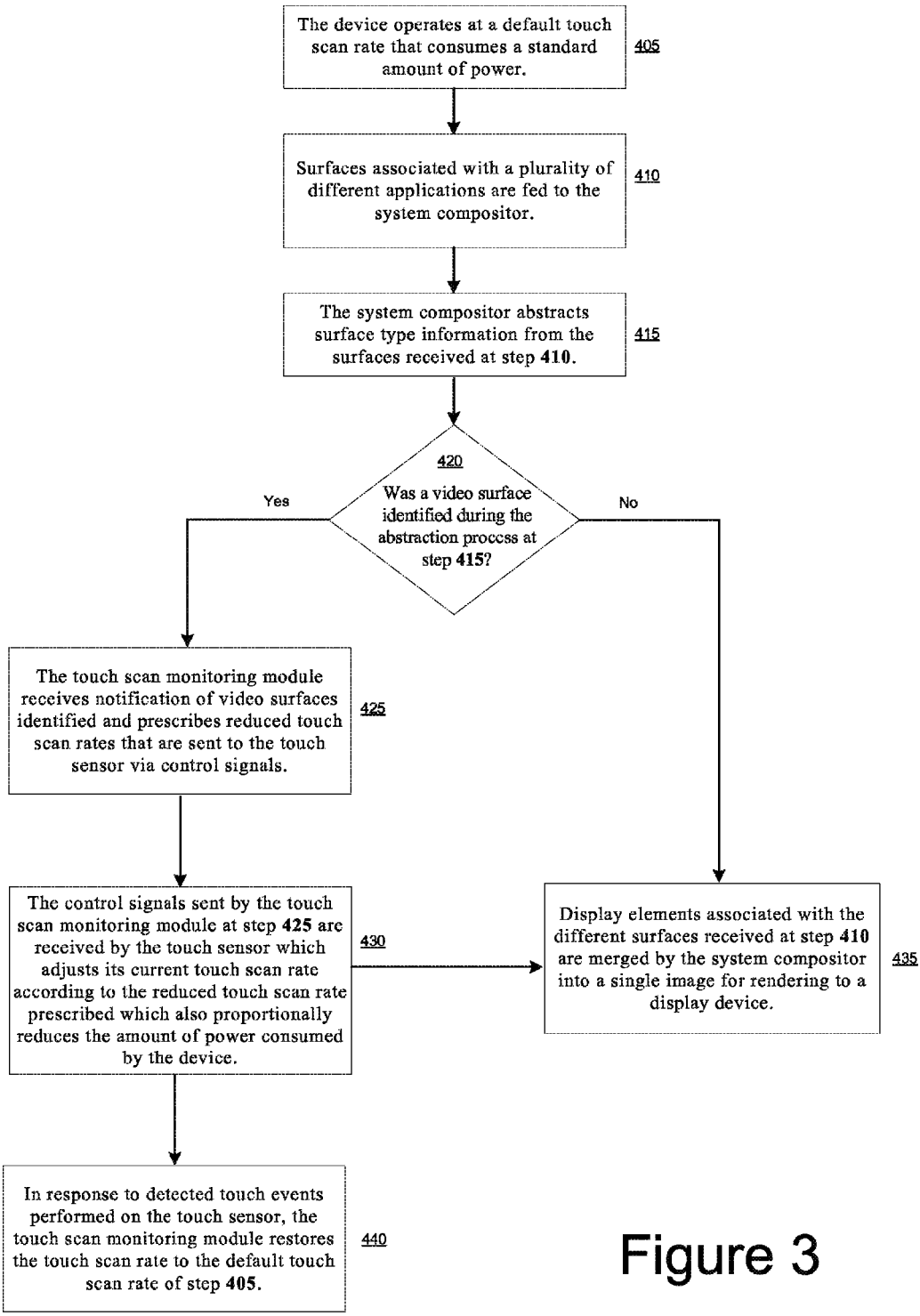
FIG. 3 is a flowchart that depicts an exemplary computer-implemented touch scan adjustment process responsive to identified surfaces in accordance with embodiments of the present invention.

FIG. 3 provides a flow chart depicting an exemplary touch scan rate adjustment process in accordance with embodiments of the present invention.

At step 405, the device operates at default touch scan rate that consumes a standard amount of power.

At step 410, surfaces associated with a plurality of different applications are fed to the system compositor.

At step 415, the system compositor abstracts surface type information from the surfaces received at step 410.

At step 420, a determination is made as to whether a video surface was identified during the abstraction process at step 415. If a video surface was identified, then the touch scan monitoring module receives notification of the video surfaces identified and prescribes reduced touch scan rates that are sent to the touch sensor via control signals, as detailed in step 425. If a video surface was not identified, then the display elements associated with the surfaces received at step 410 are merged by the system compositor into a single image for rendering to a display device, as detailed in step 435.

At step 425, a video surface was identified and, therefore, the touch scan monitoring module receives notification of the video surfaces identified and prescribes reduced touch scan rates that are sent to the touch sensor via control signals.

At step 430, control signals sent by the touch scan monitoring module at step 425 are received by the touch sensor which correspondingly adjusts its current touch scan rate according to the reduced touch scan rate prescribed which also proportionally reduces the amount of power consumed by the device. Furthermore, the display elements associated with the surfaces received at step 410 are merged by the system compositor into a single image for rendering to a display device, as detailed in step 435.

At step 435, a video surface was not identified and, therefore, the display elements associated with the surfaces received at step 410 are merged by the system compositor into a single image for rendering to a display device.

At step 440, in response to detected touch events performed on the touch sensor, the touch scan monitoring module restores the touch scan rate to the default touch scan rate of step 405.

Figure 4:
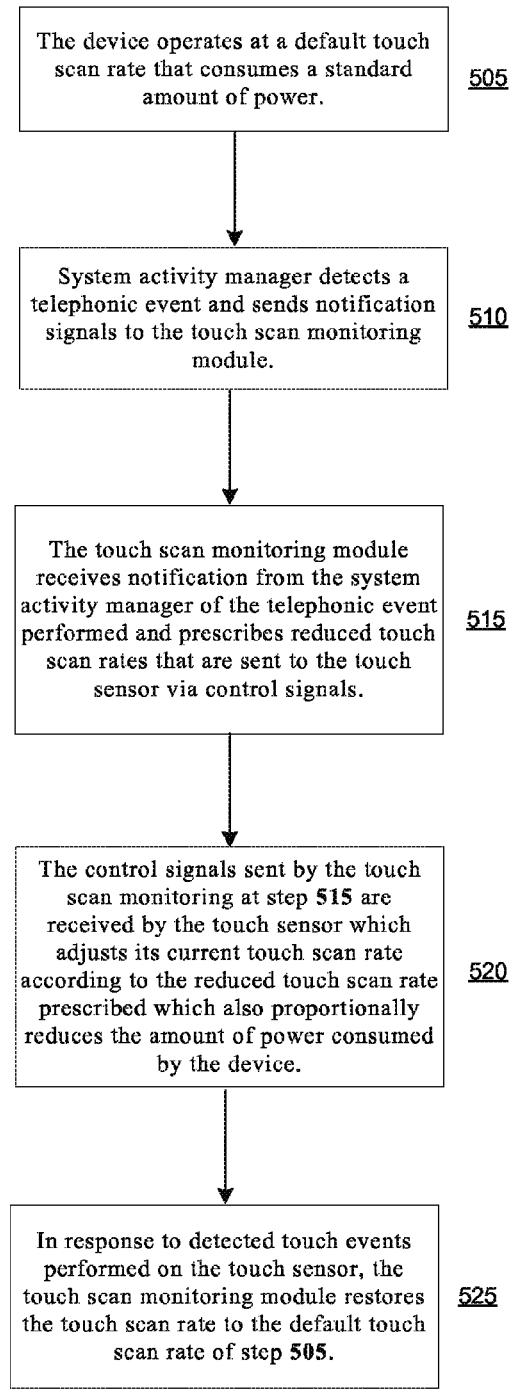
FIG. 4 is a flowchart that depicts an exemplary computer-implemented touch scan adjustment process responsive to detected system events in accordance with embodiments of the present invention.

FIG. 4 provides a flow chart depicting an exemplary touch scan rate adjustment process in accordance with embodiments of the present invention.

At step 505, the device operates at default touch scan rate that consumes a standard amount of power.

At step 510, the system activity manager detects a telephonic event and sends notification signals to the touch scan monitoring module.

At step 515, the touch scan monitoring module receives notification from the system activity manager of the telephonic event performed and prescribes reduced touch scan rates that are sent to the touch sensor via control signals.

At step 520, control signals sent by the touch scan monitoring module at step 515 are received by the touch sensor which adjusts its current touch scan rate according to the reduced touch scan rate prescribed which also proportionally reduces the amount of power consumed by the device.

At step 525, in response to detected touch events performed on the touch sensor, the touch scan monitoring module restores the touch scan rate to the default touch scan rate of step 505.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system.

These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above disclosure. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of controlling a touch sensitive panel of a computing device, said method comprising:
    scanning said touch sensitive panel at a first rate to detect a user interaction therewith;
    detecting an event within said computing device, wherein said event is an identification of a surface type made based on metadata associated with a surface when compositing layers of surface data into a resultant image for display wherein said compositing layers further comprises:
        receiving said layers of surface data using a compositing module; and
        extracting surface type information from metadata associated with said surface data; and
    responsive to said event, scanning said touch sensitive panel at a second rate based on said surface type to detect a user interaction therewith, said second rate slower than said first rate wherein less power is consumed at said second rate versus said first rate and wherein further said event indicates a presence of a use case of said computing device in which any user interaction of said touch sensitive panel is limited.

2. The method as described in claim 1, wherein said surface type is a video surface.

3. The method as described in claim 1, wherein said surface type is a camera surface.

4. The method as described in claim 1, wherein said event is an activation of a telephone application.

5. The method as described in claim 1, wherein said event is a soft keyboard display event.

6. The method as described in claim 1, further comprising restoring said first rate when:
    (a) said event terminates or (b) a touch event is detected.

7. A system for controlling a touch sensitive panel of a computing device, said system comprising:
    a touch sensor operable to perform scanning operations at a first rate to detect a user interaction therewith, wherein said touch sensor is operable to perform said scanning operations at a second rate to detect a user interaction therewith, said second rate slower than said first rate wherein less power is consumed at said second rate versus said first rate; and
    a monitoring module operable to prescribe said second rate for said touch sensor via control signals sent thereto responsive to a detection of an event within said computing device, wherein said event is an identification of a surface type made based on metadata associated with a surface when compositing layers of surface data using a compositing module to receive said layers of surface data and abstract surface type information from metadata associated with said surface data into a resultant image for display and said touch sensor scans said touch sensitive panel at said second rate based said surface type to detect said user interaction, wherein said event indicates a presence of a use case of said computing device in which any user interaction of said touch sensor is limited.

8. The system as described in claim 7, wherein said surface type is a video surface.

9. The system as described in claim 7, wherein said surface type is a camera surface.

10. The system as described in claim 7, wherein said event is an activation of a telephone application.

11. The system as described in claim 7, wherein said event is a soft keyboard display event.

12. The system as described in claim 7, wherein said monitoring module is further operable to restore said first rate when: (a) said event terminates or (b) a touch event is detected.

13. A method of controlling a touch sensitive panel of a computing device, said method comprising:
    scanning said touch sensitive panel at a first rate to detect a user interaction therewith, wherein said first rate is a default scan rate;
    detecting an event within said computing device, wherein said event is an identification of a surface type made based on metadata associated with a surface when compositing layers of surface data into a resultant image for display, wherein said compositing layers further comprises:
        receiving said surface data using a compositing module; and
        extracting surface type information from metadata associated with said surface data;
    responsive to said event, scanning said touch sensitive panel at a second rate based on said surface type to detect a user interaction therewith, said second rate slower than said first rate wherein less power is consumed at said second rate versus said first rate and wherein further said event indicates a presence of a use case of said computing device in which any user interaction of said touch sensitive panel is limited; and
    responsive to detecting a termination of said event, scanning said touch sensitive panel at said default rate.

14. The method as described in claim 13, wherein said surface type is a video surface.

15. The method as described in claim 13, wherein said surface type is a camera surface.

16. The method as described in claim 13, wherein said event is an activation of a telephone application.

17. The method as described in claim 13, wherein said event is a soft keyboard display event.

18. The method as described in claim 13, wherein said event is a full-screen video display event.

* * * * *